(12) United States Patent
Kolesnikov et al.

(10) Patent No.: US 10,102,878 B2
(45) Date of Patent: Oct. 16, 2018

(54) METHOD, APPARATUS AND SYSTEM FOR DISPLAYING IMAGES

(71) Applicant: CANON KABUSHIKI KAISHA, Tokyo (JP)

(72) Inventors: Volodymyr Kolesnikov, Dee Why (AU); Christopher James Rosewarne, Concord West (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/236,673

(22) Filed: Aug. 15, 2016

(65) Prior Publication Data
US 2017/0062005 A1    Mar. 2, 2017

(30) Foreign Application Priority Data

Aug. 27, 2015 (AU) ................ 2015218498

(51) Int. Cl.
| | |
|---|---|
| H04N 5/783 | (2006.01) |
| H04N 9/80 | (2006.01) |
| G11B 27/00 | (2006.01) |
| G11B 27/36 | (2006.01) |
| H04N 5/57 | (2006.01) |
| H04N 5/58 | (2006.01) |
| H04N 5/76 | (2006.01) |
| H04N 9/804 | (2006.01) |

(52) U.S. Cl.
CPC ........... *G11B 27/005* (2013.01); *G11B 27/36* (2013.01); *H04N 5/57* (2013.01); *H04N 5/58* (2013.01); *H04N 5/76* (2013.01); *H04N 5/783* (2013.01); *H04N 9/8042* (2013.01)

(58) Field of Classification Search
CPC ........ G11B 27/005; G11B 27/36; H04N 5/57; H04N 5/58
USPC ........ 386/343, 218, 219, 248, 300, 307, 353
See application file for complete search history.

(56) References Cited

U.S. PATENT DOCUMENTS

| | | | |
|---|---|---|---|
| 8,872,836 B2 | 10/2014 | Rabii | |
| 8,903,171 B2 | 12/2014 | Volcker et al. | |
| 2009/0096807 A1* | 4/2009 | Silverstein | ............ G06T 11/001 345/593 |
| 2016/0314760 A1* | 10/2016 | Jangda | ..................... G09G 5/10 |

* cited by examiner

*Primary Examiner* — Robert Chevalier
(74) *Attorney, Agent, or Firm* — Canon U.S.A., Inc. IP Division

(57) ABSTRACT

A method of displaying images on a display. Images from a video playback are displayed on the display with a first luminance profile, the luminance profile mapping video data samples to output luminance of the display. A user initiated modification of a speed of the video playback is detected. A second luminance profile is determined for the display of the video playback, the second luminance profile being determined according to the modified speed of the video playback and a predetermined adaptation speed of a human visual system of a viewer of the video playback. Further images from the video playback are displayed on the display using the determined second luminance profile.

19 Claims, 14 Drawing Sheets

| Byte / Bit # | 7 | 6 | 5 | 4 | 3 | 2 | 1 | 0 |
|---|---|---|---|---|---|---|---|---|
| HB0 1201 | Packet Type 1204 ||||||||
| HB1 1202 | Playback speed ratio 1205 ||||||||
| HB2 1203 | ||||||||

Fig. 12A

| Byte / Bit # | 7 | 6 | 5 | 4 | 3 | 2 | 1 | 0 |
|---|---|---|---|---|---|---|---|---|
| HB0 1221 | Packet Type 1224 ||||||||
| HB1 1222 | 1225 | Playback speed ratio 1226 |||||||
| HB2 1223 | ||||||||

Fig. 12B

METHOD, APPARATUS AND SYSTEM FOR DISPLAYING IMAGES

REFERENCE TO RELATED PATENT APPLICATION(S)

This application claims the benefit under 35 U.S.C. § 119 of the filing date of Australian Patent Application No. 2015218498, filed Aug. 27, 2015, hereby incorporated by reference in its entirety as if fully set forth herein.

TECHNICAL FIELD

The aspects of the present invention relate generally to delivery of video to displays such as televisions, personal computer monitors, displays of portable devices, digital cinema displays and the like. The aspects of the present invention relate in particular to a method, apparatus and system for displaying images on a display. The aspects of the present invention also relate to a computer program product including a computer readable medium having recorded there on a computer program for displaying images on a display.

BACKGROUND

The dynamic range of a display is a ratio between the smallest and the largest possible luminance that can be reproduced. Contemporary displays such as televisions and computer monitors support displaying content with a high dynamic range (HDR). Such displays have peak luminance significantly higher than displays supporting only standard dynamic range (SDR).

Traditional cathode ray tube (CRT) displays typically have a dynamic range of one to three hundred (1:300) and peak luminance of about one hundred (100) candela per meter square ($cd/m^2$). A Liquid Crystal Display (LCD) backlit by an instant fluorescent light emitter typically has a peak luminance of around three hundred to five hundred (300-500) $cd/m^2$ and a dynamic range of one to eight hundred (1:800). CRT displays and LCD displays are examples of SDR displays.

An LCD display backlit by a grid of independently modulated light emitting diodes (LEDs), is an example of an HDR display, and can reach peak luminance of four thousand (4000) $cd/m^2$ and a dynamic range of one to twenty thousand (1:20000). A display using quantum dot technology, is another example of an HDR display, and can reach a peak luminance forty thousand (40000) $cd/m^2$ and exceed a dynamic range of one to ten to power four ($1:10^4$).

The human visual system (HVS) is generally known to be able to perceive luminance from as low as ten to the power of minus six ($10^{-6}$) $cd/m^2$ to as high as ten to the power eight ($10^8$) $cd/m^2$. However, at any given time the human visual system (HVS) is known to be limited to a dynamic range of one to one thousand (1:1000). The human visual system (HVS) performs dynamic adaptation to viewing conditions as the viewing conditions change. The adaptation performed by the human visual system (HVS) is not instant and typically can take up to five (5) minutes to fully adapt to brighter environment and up to thirty (30) minutes to fully adapt to a darker environment. If, during a playback of video data, the speed of display luminance variations exceeds the human visual system (HVS) adaptation speed, a viewer can experience degradation of viewing experience and visual discomfort.

SUMMARY

According to one aspect of the present disclosure, there is provided a method of displaying images on a display, the method comprising:

displaying images from a video playback on the display with a first luminance profile, the luminance profile mapping video data samples to output luminance of the display;

detecting a user initiated modification of a speed of the video playback;

determining a second luminance profile for the display of the video playback, the second luminance profile being determined according to the modified speed of the video playback and a predetermined adaptation speed of a human visual system of a viewer of the video playback; and displaying further images from the video playback on the display using the determined second luminance profile.

According to another aspect of the present disclosure, there is provided a system for displaying images on a display, the system comprising:

a memory for storing data and a computer program;

a processor coupled to the memory for executing said computer program, said computer program comprising instructions for:

displaying images from a video playback on the display with a first luminance profile, the luminance profile mapping video data samples to output luminance of the display;

detecting a user initiated modification of a speed of the video playback;

determining a second luminance profile for the display of the video playback, the second luminance profile being determined according to the modified speed of the video playback and a predetermined adaptation speed of a human visual system of a viewer of the video playback; and displaying further images from the video playback on the display using the determined second luminance profile.

According to another aspect of the present disclosure, there is provided an apparatus of displaying images on a display, the apparatus comprising:

display module displaying images from a video playback on the display with a first luminance profile, the luminance profile mapping video data samples to output luminance of the display;

detection module for detecting a user initiated modification of a speed of the video playback; and determining module for determining a second luminance profile for the display of the video playback, the second luminance profile being determined according to the modified speed of the video playback and a predetermined adaptation speed of a human visual system of a viewer of the video playback, wherein further images from the video playback are displayed on the display using the determined second luminance profile.

According to another aspect of the present disclosure, there is provided a computer readable medium having a program stored thereon for displaying images on a display, the program comprising:

code for displaying images from a video playback on the display with a first luminance profile, the luminance profile mapping video data samples to output luminance of the display;

code for detecting a user initiated modification of a speed of the video playback;

code for determining a second luminance profile for the display of the video playback, the second luminance profile being determined according to the modified speed of the video playback and a predetermined adaptation speed of a human visual system of a viewer of the video playback; and code for displaying further images from the video playback on the display using the determined second luminance profile.

Other aspects are also disclosed.

BRIEF DESCRIPTION OF THE DRAWINGS

At least one embodiment of the present invention will now be described with reference to the following drawings and appendices, in which:

FIGS. 12A and 12B are schematic diagrams showing a structure of High-Definition Multimedia Interface (HDMI) Consumer Electronics Control (CEC) packets for transmitting information about the playback speed ratio.

DETAILED DESCRIPTION INCLUDING BEST MODE

Figure 1:
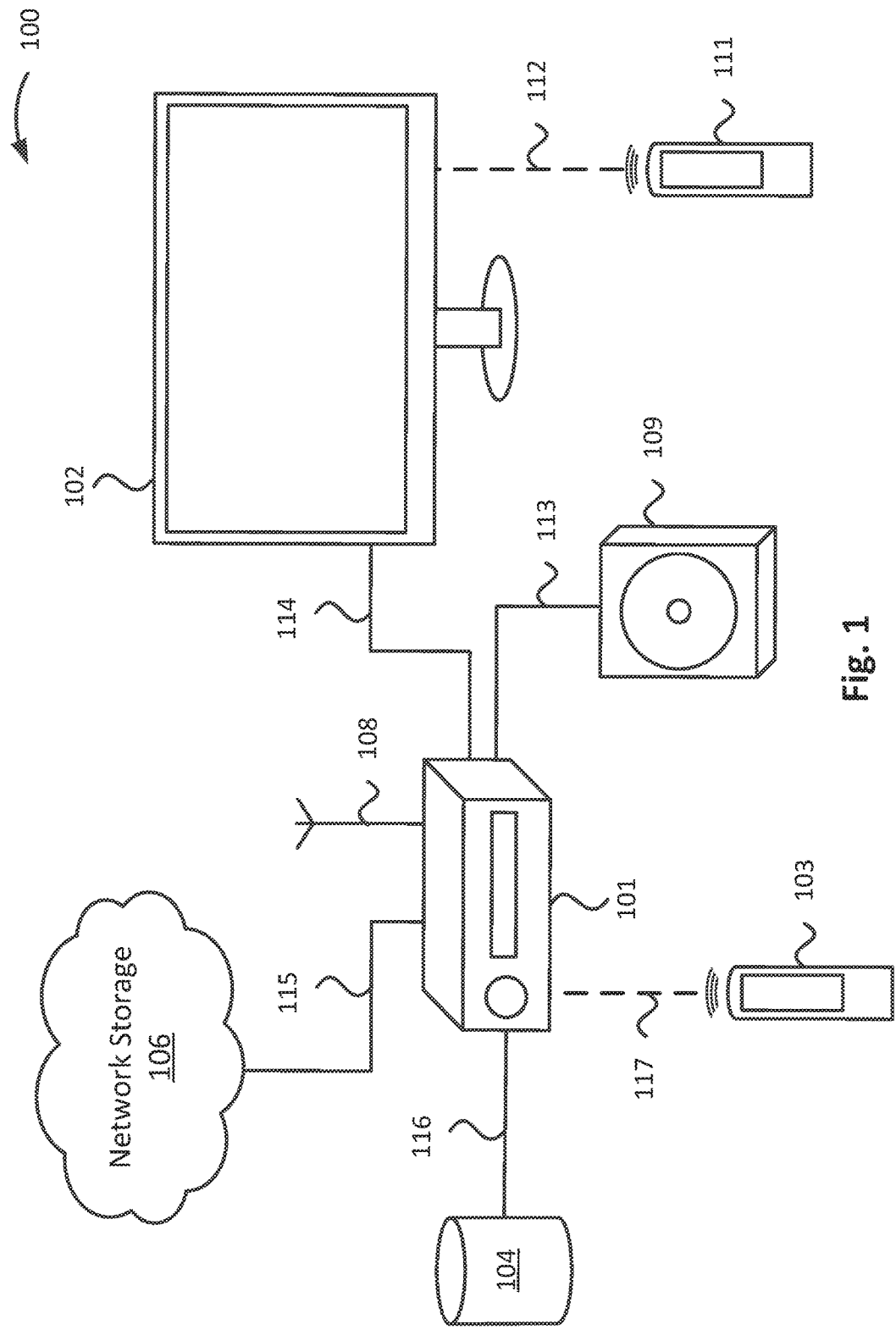
FIG. 1 is a schematic diagram showing a video playback system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram of a video playback system 100. A video playback device 101 receives video data from a non-transitory storage device such as a Network Attached Storage (NAS) system 104 using a communication channel 116 (e.g., a local area network (LAN)), a media device 109 (e.g., a Digital Video Disc (DVD) reader or a hard disk drive (HDD)) using a communication channel 113 (e.g., a serial AT attachment (SATA) interface), a radio antenna 108, or a network storage 106 using a wide area network (WAN) connection 115. In one embodiment, the video playback device 101 receives the video data from another video data input device. The video playback device 101, upon receiving the video data as a bitstream of encoded video data, may decode the bitstream and convert the video data to a format supported by a video display device 102. As described in detail below, the video display device 102 has a luminance profile. The luminance profile comprises information to map video data from the bitstream with values in the perceptually uniform domain to samples in a linear luminance domain. The video playback device 101 outputs video data to the video display device 102 using a communication channel 114 such as High-Definition Multimedia Interface (HDMI).

The video playback device 101 may also be configured to receive video playback control commands such as 'play', 'stop', 'pause', 'fast-forward', 'rewind' and 'slow-motion' from an infrared remote control device 103, under control of a human viewer, using a wireless communication channel 117. Upon receiving a playback control command, the video playback device 101 changes video playback mode as will be described below.

The video display device 102 may be a CRT television, a LCD computer display, the organic light emission device (OLED) display of a portable device, or any other device suitable for representing visual information. The video display device 102 will have a particular luminance profile depending on the type of the display 102 (e.g., CRT, LCD or OLED). The display device 102 may support video data input from the High Definition Multimedia Interface (HDMI), Digital Visual Interface (DVI), Video Graphics Array (VGA) or another video data input method.

The video playback device 101 may be also configured to receive video playback control commands by receiving commands from an infrared remote control device 111 via a wireless communication channel 112.

Figure 2A:
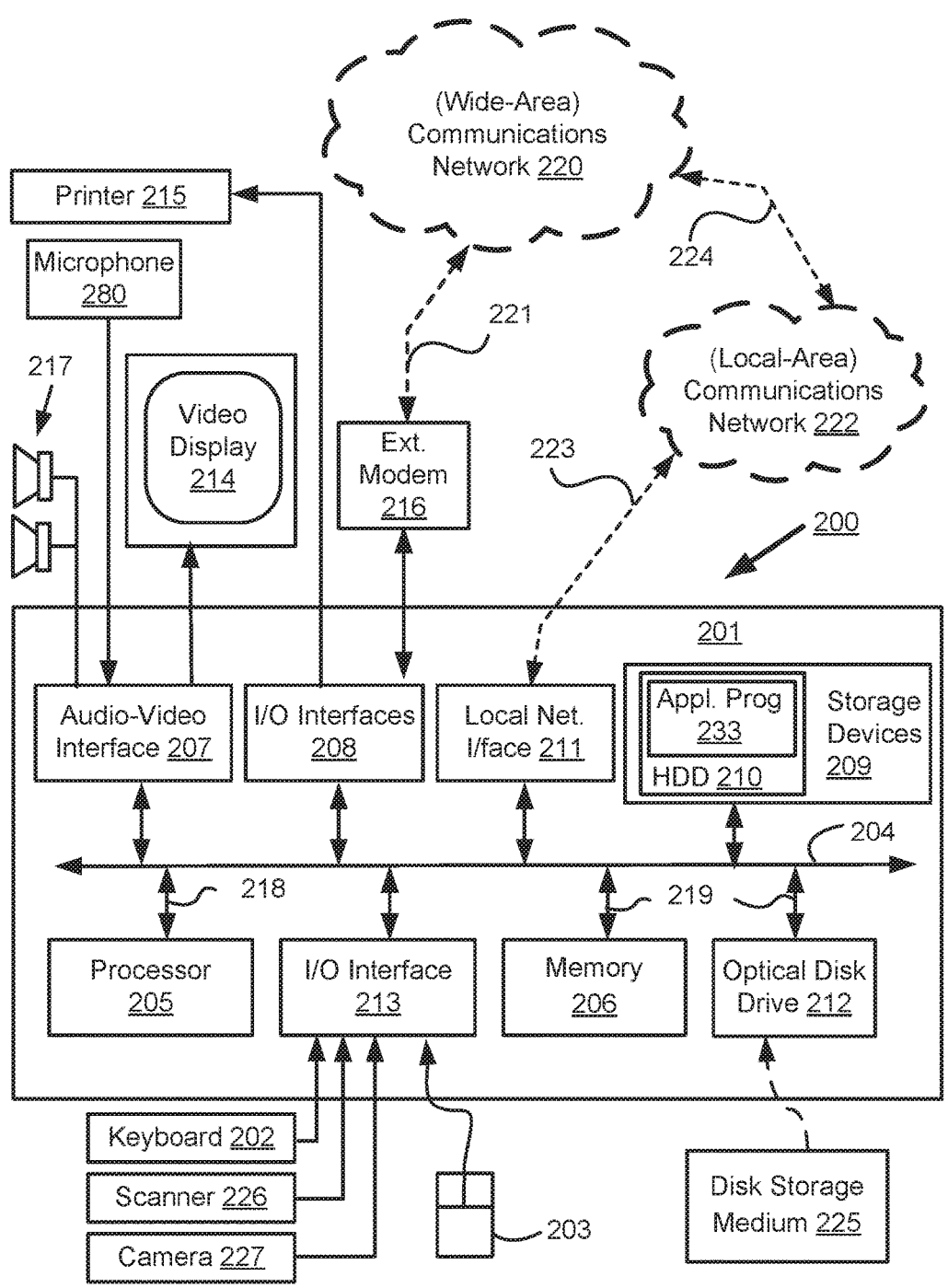
FIGS. 2A and 2B form a schematic block diagram of a general purpose computer system upon which one or both of the video playback system of FIG. 1 may be practiced.

Notwithstanding the example devices mentioned above, each of the playback device 101 and display device 102 may be implemented using a general purpose computing system, typically through a combination of hardware and software components. FIG. 2A shows such a computer system 200, which includes: a computer module 201 forming the playback device 101; input devices such as a keyboard 202, a mouse pointer device 203, a scanner 226, a camera 227, and a microphone 280; and output devices including a printer 215, a display device 214 forming the display device 102, and loudspeakers 217. An external Modulator-Demodulator (Modem) transceiver device 216 may be used by the computer module 201 for communicating to and from a communications network 220 via a connection 221. The communications network 220, which may form the communication network 106, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may additionally be provided in the playback device 101 and the display device 102.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless embodiment or an IEEE 802.11 wireless embodiment; however, numerous other types of interfaces may be practiced for the interface 211. The local network interface 211 may also provide the functionality of the NAS module 104, may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the media device 109, or as a destination for decoded video data to be stored for reproduction via the display 214.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described embodiments can be practised include IBM-PC's and compatibles, Sun SPARCstations, Apple Mac or alike computer systems.

Where appropriate or desired, the methods described below, may be implemented using the computer system 200 wherein the playback device 101 and the display device 102 and methods to be described, may be implemented as one or more software application programs 233 executable within the computer system 200. In particular, the playback device 101, the display device 102 and the steps of the described methods may be effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and is then executed by the computer system 200. A computer readable medium having such software or computer program recorded on the computer readable medium is a computer program product. The use of the computer program product in the computer system 200 effects an apparatus for implementing the playback device 101, the display device 102 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
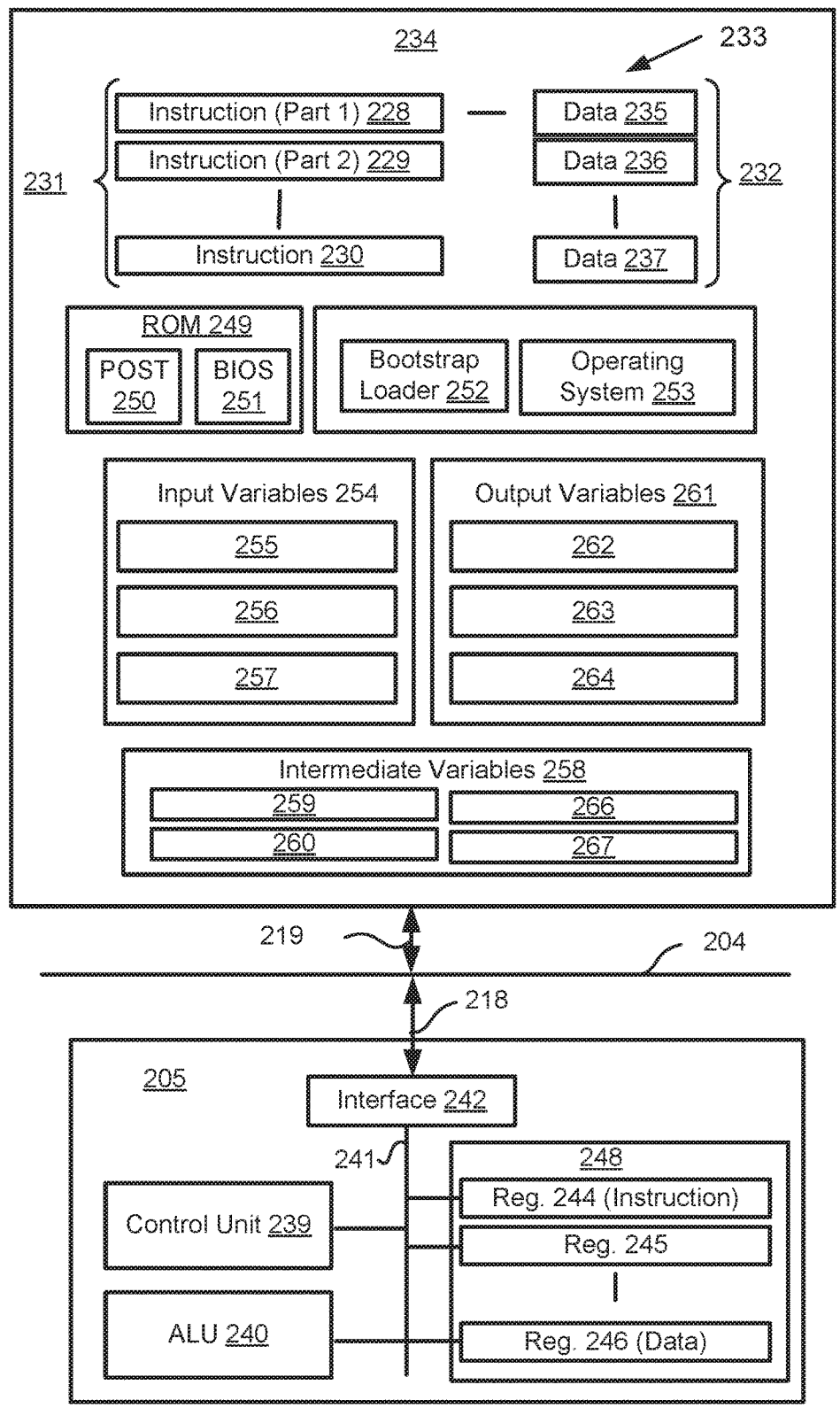

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A is to be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The display device 101, the playback device 102 and the described methods may use input variables 254, which are stored in the memory 234 in corresponding memory locations 255, 256, 257. The display device 101, the playback device 102 and the described methods may produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 3:
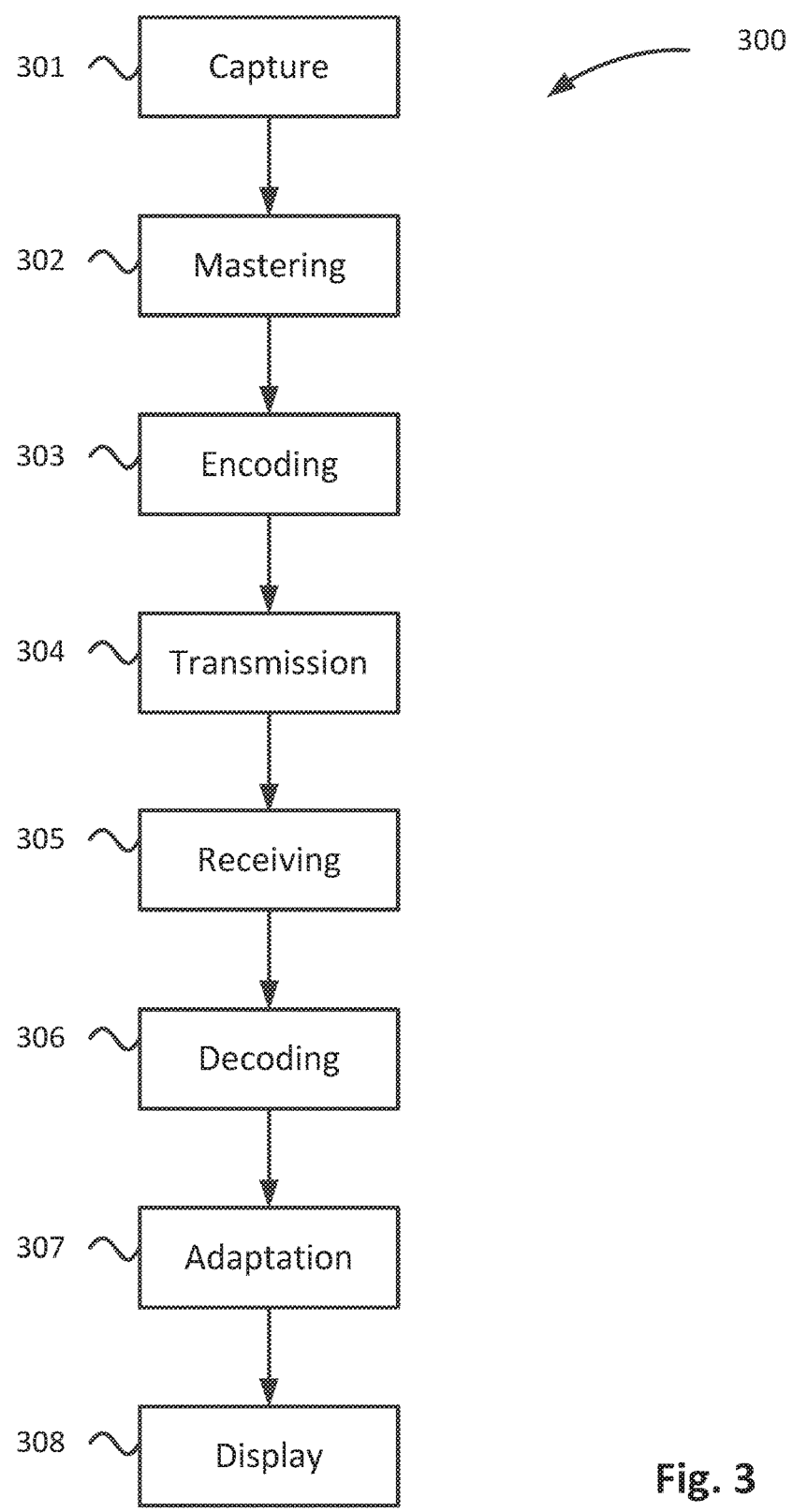
FIG. 3 is a schematic block diagram of a video processing software architecture.

FIG. 3 is a schematic block diagram of a video processing software architecture 300 that illustrates software modules 301-308 configured for capturing video data through to displaying video data to a human viewer. Each of the software modules 301-308 may be implemented as one or more software code modules of the software application program 233 resident in the hard disk drive 210 and being controlled in its execution by the processor 205.

As seen in FIG. 3, a video capture module is used to capture video data using the camera 227. Alternatively, the video capture module 301, under execution of the processor 205, may generate synthetic video data. The camera 227 may be equipped with a Charge-coupled Device (CCD) or Complementary metal-oxide-semiconductor (CMOS) image sensor. The video captured by the camera 227 may have a standard dynamic range (SDR) or high dynamic range (HDR). Contemporary high-end cameras offer a dynamic range of up to fifteen (15) f-stops (a contrast ratio of $1:2^{15}$) which exceeds the instantaneous dynamic range of the human visual system (HVS). Contemporary HDR image and video storage formats, commonly used for storing of both camera-captured and computer-generated video, may use high precision floating point formats. The high precision floating point formats may include single precision and double precision formats specified by the IEEE 754 standard supporting dynamic ranges of up to two hundred fifty six (256) f-stops (a contrast ratio of $1:2^{256}$) and up to two thousands and forty eight (2048) f-stops (a contrast ratio of $1:2^{2048}$) correspondingly.

A mastering module 302 performs mastering of the video data captured by the module 301. The mastering may be performed automatically, or under the control of a human operator using the input devices (e.g., the keyboard 202, mouse pointer device 203). Mastering performed by the module 302 includes altering the colours and luminance of the video, typically for imposing a desired 'artistic intent', or maintaining artistic consistency with other video data. Such a process is also known as 'colour grading'. In particular, the luminance of the video data may be adjusted to ensure that temporal and spatial changes in display luminance during playback do not exceed levels comfortable for the human visual system (HVS) of a human viewer viewing the video data. To efficiently perform such luminance adjustment, parameters that affect human visual system (HVS) adaptation, such as speed of scene luminance temporal changes and ambient luminance of viewing environment, are taken into account. Ambient luminance of the viewing environment may not be exactly known during the colour grading process and may be assumed to conform to recommended viewing conditions such as those specified by ITU-R BT.2035 'A reference viewing environment for evaluation of HDTV program material or completed programmes'. Other parameters affecting human visual system (HVS) adaptation may be assumed implicitly, such as constant video playback speed. Generally, a set of parameters affecting human visual system (HVS) adaptation together with algorithms approximating various aspects of human visual system (HVS) behaviour relevant to human visual system (HVS) adaptation comprises a human visual system (HVS) model. Actual viewing conditions during video playback may be different from those assumed during colour grading, and the playback device 101 or the display device 102 may further modify video data luminance to provide a better viewing experience as described below.

An encoding module 303 encodes the video data into a bitstream. The encoding usually comprises applying a video compression algorithm such as H.264/MPEG-4 Part 10, Advanced Video Coding (AVC) or H.265/MPEG-H Part 2 High Efficiency Video Coding (HEVC).

A transmission module 304 transmits portions of the bitstream created by the module 303 to a receiving module 305 over a communication channel on behalf of a decoding module 306.

The receiving module 305 receives the portions of the bitstream from the transmission module 304 and stores the portions of the bitstream at least until the portions are read by the decoding module 306.

The decoding module 306 reads portions of the bitstream from the receiving module 305 and decodes the video data from the portions of the bitstream.

At video playback time, the viewing conditions in a viewing environment of the display device 102 may differ significantly from those assumed by the mastering module 302 during the mastering process. An adaptation module 307 modifies the decoded video data for displaying on the display device 102. The modification comprises accounting for the speed of display luminance variations and ambient viewing conditions and adjusting video. The adaptation module 307 uses a human visual system (HVS) adaptation model to account for viewing environment and the video playback parameters affecting human visual system (HVS) brightness adaptation. In one embodiment, the modification is applied directly to the samples of the video data. In another embodiment, the adaptation is performed by modifying an Electro-Optical Transfer Function (EOTF) such as one specified by the SMPTE ST 2084 'High Dynamic Range Electro-Optical Transfer Function of Mastering Reference Displays' standard. The EOTF is then applied to the samples of the video data by the adaptation module 307 or a display module 308.

The display module 308 displays video data provided by the module 307 on the display device 102 for viewing by a human viewer. In one embodiment, the display module 308 receives an electro-optical transfer function (EOTF) modified to the viewing conditions by the adaptation module 307 and applies the electro-optical transfer function (EOTF) to the samples of the video data prior to display.

In one embodiment, the modules 305, 306 and 307 are implemented in the playback device 101 and the display module 308 is implemented in the display device 102. In another embodiment, where for example the display device 102 is in the form of an LCD computer display, the playback device 101 is integrated with the display device 102 and the modules 305-308 are implemented in the display device 102.

In contemporary video codecs such as Advanced Video Coding (AVC) and High Efficiency Video Coding (HEVC), an image (sometimes referred to in the art and hereinafter as a 'picture') formed by the video data is compressed by the encoding module 303 using either 'intra-prediction' or 'inter-prediction' mode. Intra-prediction is an approach where an image is encoded without references to other images. Intra-predicted images have significantly higher bit-rate for the same image quality compared to inter-predicted images, however, decoding an intra-predicted image does not require availability of any other images; transmission errors introduced in other images do not affect decoding of an intra-predicted image. Inter-prediction improves compression ratio without degradation of the image quality. To decode an inter-predicted image, the decoding module 306 first decodes and buffers pictures referenced by the decoded image. The decoding and buffering of the images referenced by the decoded image requires an additional memory buffer in the decoding module 306 to store reference images, introducing additional decoding delays and is prone to inter-picture error propagation.

Figure 4:
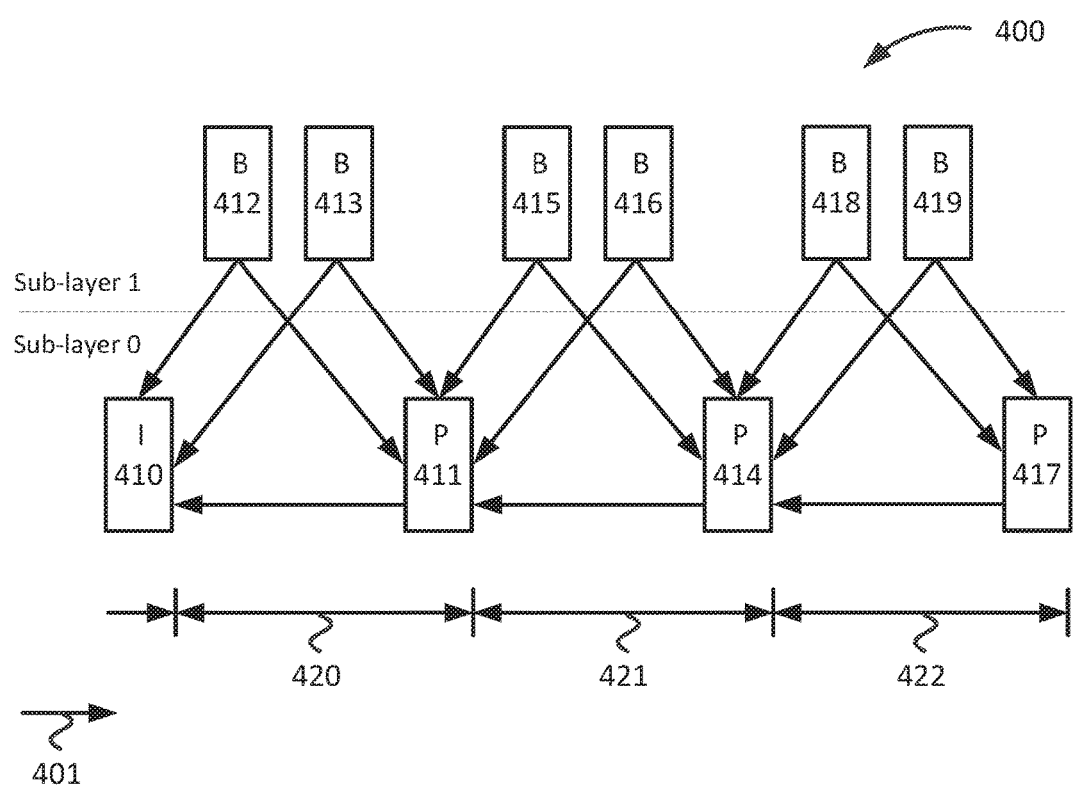
FIG. 4 is a schematic diagram of a video image sequence.

FIG. 4 is a schematic diagram of a video image sequence 400 represented by example images 410-419. The images 410-419 are ordered in FIG. 4 along a time axis 401 according to an order in which the images 410-419 are intended to be displayed, known as a 'display order'. The images 410-419 are numbered according to an order in which the images 410-419 are stored in the bitstream and decoded, known as a 'bitstream order' or 'decoding order'.

In the example of FIG. 4, image 410 is an intra-predicted image ('I-image'), while images 411, 414, 417 are inter-predicted images that use a single reference image ('P-images'). The images 410, 411, 414, 417 belong to a temporal sub-layer 0. Images 412, 413, 415, 416, 418 and 419 are inter-predicted images that use two reference images ('bi-predicted images' or 'B-images') and belong to a temporal sub-layer 1. Temporal sub-layers in video codecs such as HEVC represent a form of temporal scalability, where images belonging to temporal sub-layers with lower indices do not have references to images from higher sub-layers and comprise a valid bitstream. The temporal scalability capability is used by media-aware network elements (MANEs) to reduce bitrate on congested networks. Prediction dependencies are represented in FIG. 4 by arrows pointing in the direction of reference. Every video image sequence starts with an intra-predicted image. There is no decoding requirement to have any more intra-predicted images in the sequence. However, in practice intra-predicted images are inserted at regular intervals ('intra-periods') to limit transmission error propagation from incorrectly decoded reference images to dependent images, and to facilitate operation of some playback modes as described below. A choice of an intra-period length is a trade-off between error resilience and usability on one side and the size of the bitstream on the other side.

A group of pictures ('GOP') or structure of pictures ('SOP') is one or more images consecutive in the decoding order, in which the first image in the decoding order is a reference image belonging at the lower temporal sub-layer and no coded image except potentially the first image in the decoding order is an intra-predicted image. The example of the FIG. 4 shows three groups of pictures (GOPs) 420-422.

The decoding module 306 operates two memory buffers. A coded picture buffer ('CPB') is used to store portions of the bitstream comprising individual pictures to be decoded. A decoded picture buffer ('DPB') is used to store decoded images. The coded picture buffer and decoded picture buffer may be configured within the memory 206.

The decoding module 306 reads and decodes images from the coded picture buffer in the decoding order. The decoded images are stored in the decoded picture buffer in the decoding order. The adaptation module 307 and the display module 308 read images from the decoded picture buffer in the display order. The display order is determined from an picture order count ('POC'). The picture order count is an integer value that is decoded by the decoding module 306 from the bitstream for each image.

The playback device 101 is configured for supporting several playback modes, where each of the modes is associated with a different playback speed, such as a 'normal' mode, a 'pause' mode and so-called 'trick-modes': 'fast-forward', 'rewind' and 'slow-motion'.

The 'normal' playback mode is associated with a normal playback speed. The normal playback mode is implemented in the playback device 101 by decoding every image of the video data and outputting images from the decoded picture buffer in the order of increasing picture order count values. In the normal playback mode, each image of the video data is displayed by the display device 102 for a pre-defined duration, and the total number of images displayed per a unit of time corresponds to a pre-determined video data frame rate. In one embodiment, the information about the video data frame rate is specified in the bitstream by the encoding module 303. For example, in the HEVC, such information may be specified in Video Usability Information (VUI) or Video Parameter Set (VPS) network access layer (NAL) units, using special parameters vps_num_units_in_tick, vps_time_scale and vps_num_ticks_poc_diff_one_minus1. The special parameters are decoded from the bitstream by the decoding module 306. In another embodiment, the information about frame rate is transmitted using a side channel.

The 'fast-forward' playback mode is associated with a playback speed faster than normal. The fast-forward playback mode is implemented in the display device 101 by skipping some images from decoding and output and outputting the remaining images from the decoded picture buffer in the order of increasing picture order count values. In one embodiment, only intra-predicted images are decoded and output, such as the image 410 of the sequence 400. In the embodiment where only intra-predicted images are decoded and output, no reference image buffering is required and no delay is introduced by decoding the reference images. However, in the embodiment where only intra-predicted images are decoded and output, the choice of fast-forward acceleration ratio may be limited to the multiples of the intra-period.

In another embodiment, only temporal sub-layer zero (0) images are decoded and output, such as the images 410, 411, 414 and 417. In the embodiment where only temporal sub-layer zero (0) images are decoded and output, a previously decoded image is to be kept for reference which has an additional memory buffer. However, no additional decoding delay is introduced because only previously output images are referenced. In the embodiment where only temporal sub-layer zero (0) images are decoded and output, the choice of fast-forward acceleration ratio is limited to the multiples of the group of image size which is significantly smaller than the intra-period.

The 'rewind' playback mode is implemented in the display device 101 by skipping some images from decoding and outputting the remaining images from the decoded picture buffer in the order of decreasing picture order count values. In one embodiment, only intra-predicted images are decoded and output, such as the image 410. In the embodiment where only intra-predicted images are decoded and output, no reference image buffering is required and no delay is introduced by decoding the reference images. However, in the embodiment where only intra-predicted images are decoded and output, the choice of rewind acceleration ratio is limited to the multiples of the intra-period.

In another embodiment, only images belonging to the temporal sub-layer zero (0) are decoded and output, such as the images 417, 414, 411 and 410. In the embodiment where only images belonging to the temporal sub-layer zero (0) are decoded and output, encoded images are stored in the coded picture buffer until all reference images are read and decoded. In the worst case an amount of images that is equal to the length of the intra-period is to be stored in the coded picture buffer and decoded picture buffer.

The 'slow-motion' playback mode is associated with a playback speed slower than normal. In one embodiment, the slow-motion playback mode is implemented in the display device 101 by repeated output of the images from the decoded picture buffer in the order of increasing picture order count values. Each image is output a number of times according to a chosen deceleration ratio. Decoding of images by the decoding module 306 is slowed down accordingly to avoid memory buffer overflow.

The 'pause' playback mode is associated with zero playback speed. The pause playback mode is implemented in the display device 101 by repeated output from the decoded picture buffer of the image displayed last prior to entering the pause playback mode. Decoding of images by the decoding module 306 is stopped for the duration of the pause mode operation.

Figure 5:
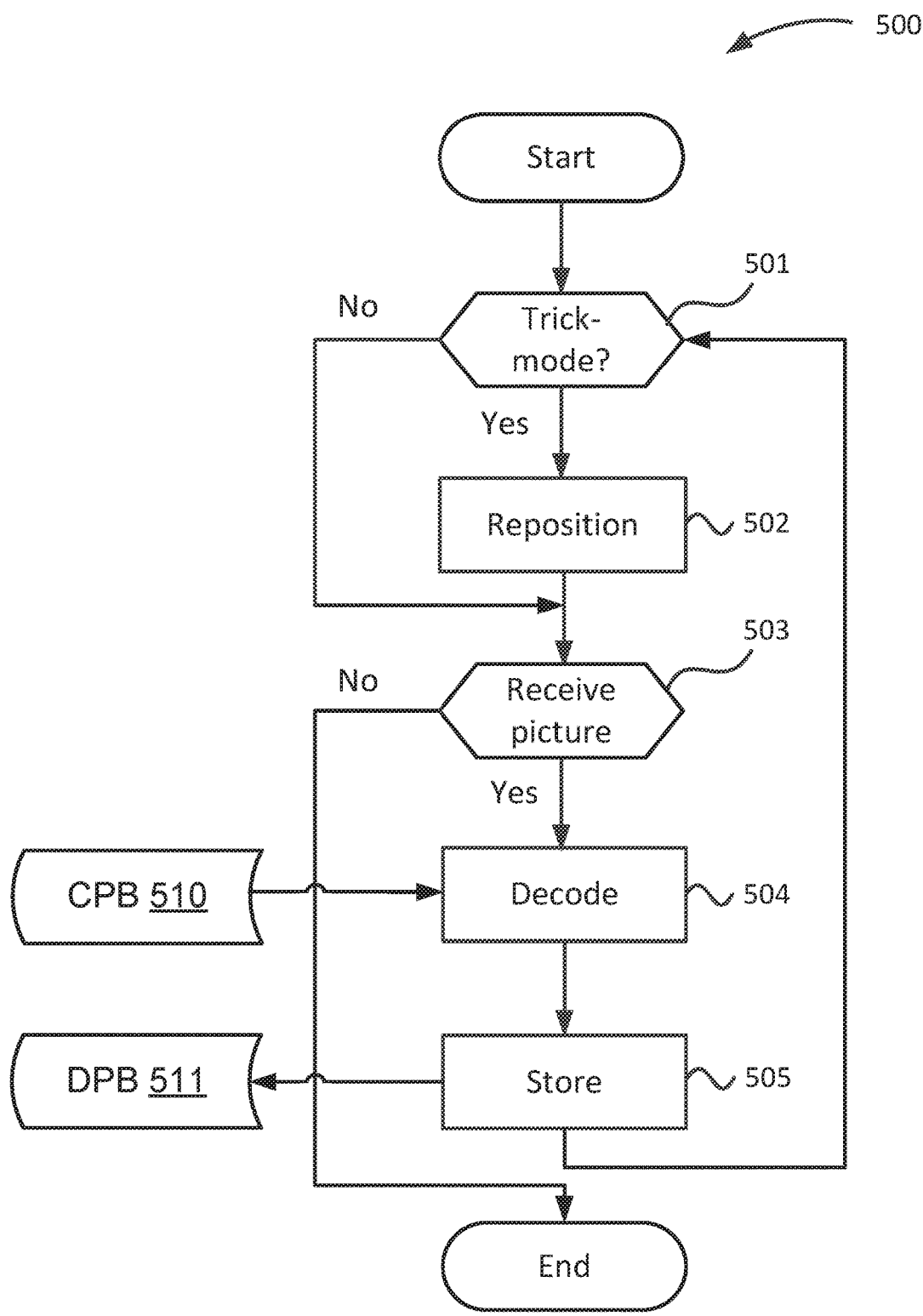
FIG. 5 is a schematic flow diagram showing a method of decoding video data from a bitstream.

FIG. 5 is a schematic flow diagram showing a method 500 of decoding video data from a bitstream. The method 500 is implemented by the decoding module 306 resident in the hard disk drive 210 and being controlled in its execution by the processor 205.

The method 500 starts with a playback mode determining step 501, where a current playback mode is determined under execution of the processor 205. If the current playback mode is one of the trick-modes, a repositioning of the bitstream read pointer may be necessary, then the control is passed to a reposition step 502. If repositioning is not necessary, the control is passed to a receive picture step 503.

At the reposition step 502, the receiving module 305 under execution of the processor 205 advances the bitstream read pointer to a next image in accordance with the current playback mode. In one embodiment, the repositioning is performed according to a pre-built bitstream picture position table. In another embodiment, the receiving module 305 under execution of the processor 205 continuously reads a portion of the bitstream looking for a marker identifying a next image to be decoded. For example, in the fast-forward playback mode, the receiving module 305 under execution of the processor 205 looks for an intra-predicted image or reference image (i.e., P-picture) NAL unit header marker. Once such a marker is determined, the bitstream read pointer is positioned to the beginning of the corresponding NAL unit or access unit.

At receive picture step 503, a portion of the bitstream starting from the current bitstream read pointer and comprising at least one image from the receiving module 305 is read by the decoding module 306 under execution of the processor 205. After reading, the receiving module 305 under execution of the processor 205, advances the bitstream read pointer by the length of the read portion of the bitstream. If an image is successfully read, the control is passed to a decode step 504. Otherwise, if an 'end of video data' or an error condition was detected, the control leaves the method 500.

At decode step 504, an image is read and decoded from a coded picture buffer 510 under execution of the processor 205.

At store step 505, the decoded image and associated picture order count value is stored in a decoded picture buffer 511 under execution of the processor 205. The decoded picture buffer 511 may be configured within the memory 206. At the store step 505, some images in the decoded picture buffer 511 are marked as available for display under execution of the processor 205. An image is marked as available for display if all images that precede it in the display order are marked as available for display, or if the decoded image is the first image of the video data in the display order. Images stored in the decoded picture buffer 511 marked as available for display are processed by the adaptation module 307 and displayed by the display module 308 as will be described below. After the step 505, the control is passed to the step 501.

Figure 6:
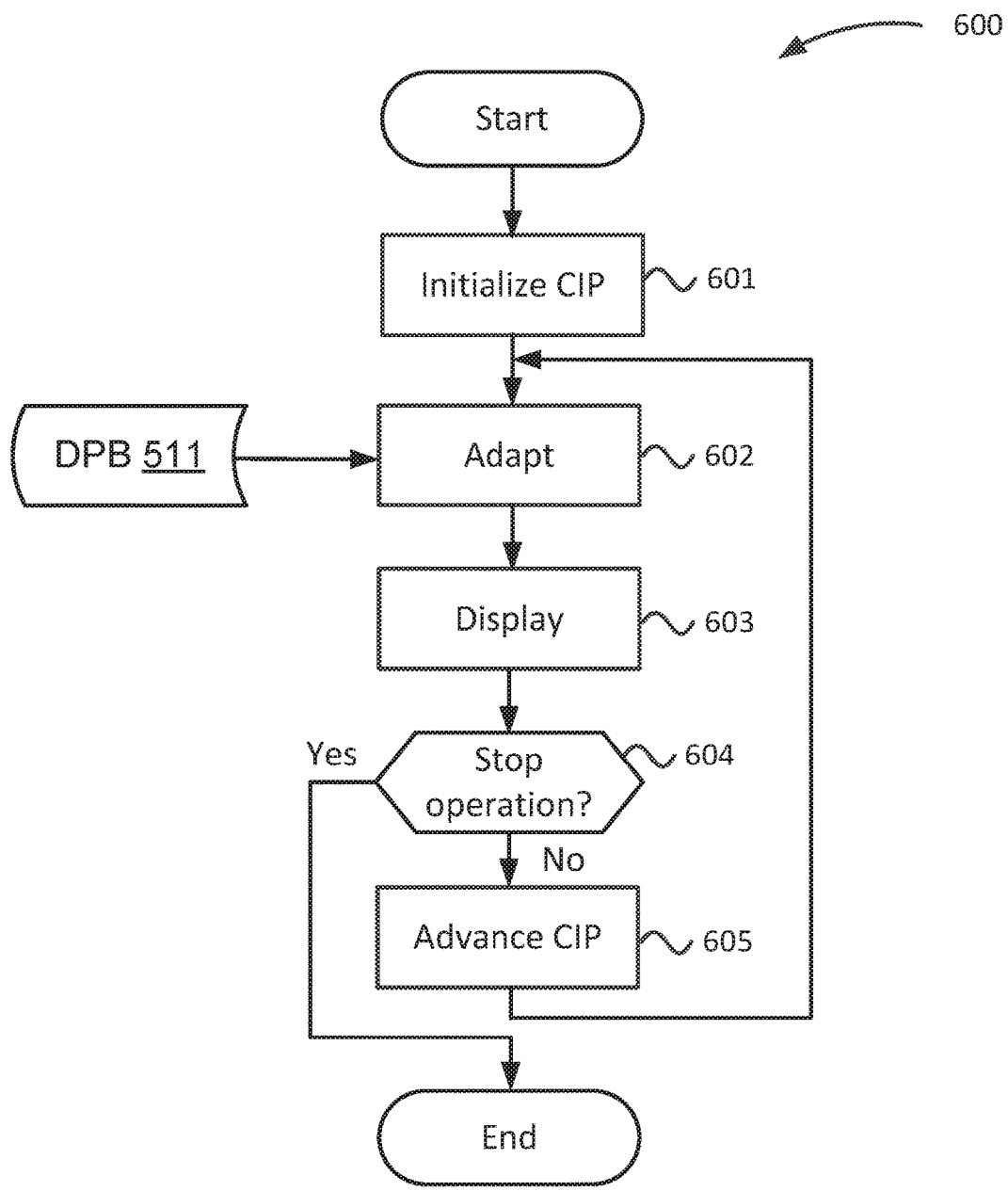
FIG. 6 is a schematic flow diagram showing a method of processing and displaying images.

FIG. 6 is a schematic flow diagram showing a method 600 of processing and displaying images from the decoded picture buffer (DPB) 511. The steps of the method 600 are performed by the adaptation module 307 and the display module 308 resident in the hard disk drive 210 and being controlled in their execution by the processor 205.

The method 600 starts with an initialize current image pointer step 601. At the initialize current image pointer step 601, a current image pointer is set to point to the first image to be displayed under execution of the processor 205. The current picture pointer is an image pointer within the decoded picture buffer 511. At an adapt step 602, the image pointed to by the current image pointer is read from the decoded picture buffer 511 and modified for comfortable viewing, taking into account the current playback speed. The modification of the image performed at step 602 are described in detail below. At a display step 603, the modified image is displayed on the display device 102 under execution of the processor 205. The duration of image display depends on the playback parameters of the video data such as the parameters specified in the Video Usability Information or Video Parameter Set, playback mode and capabilities of the display device 102 hardware.

At a checking step 604, conditions for leaving the method 600, such as reaching end of the bitstream or a playback stop command being issued by a human operator, are checked under execution of the processor 205. If such a condition is met, the execution of the method 600 concludes. Otherwise, the execution proceeds to an advance step 605. At the step 605, the processor 205 advances the current image pointer to a next image to be displayed. In the normal and fast-forward playback modes, the current image pointer is advanced to an image with the smallest picture order count that is greater than the picture order count of the image currently pointed by the current image pointer. In the pause playback mode, the current image pointer is left unchanged. In the slow motion playback mode, the current image pointer is either left unchanged, or advanced to an image with the smallest picture order count that is greater than the picture order count of the image currently pointed by the current image pointer. In the rewind playback mode, the current image pointer is advanced to an image with the largest picture order count that is smaller than the picture order count of the image currently pointed by the current image pointer. After the step 605, the control is passed to the adapt step 602.

For the purposes of the following description a 'comfortable perception range' is defined as a range of luminance values where the lower bound is equal to the darkest perceptible luminance level and the upper bound is equal to the brightest luminance level perceptible without any eye discomfort, as determined by a human visual system (HVS) luminance adaptation model. The human visual system luminance adaptation model may be implemented within the adaptation module 307 and adjusted dynamically to account for various factors affecting adaptation such as playback speed.

Figure 7:
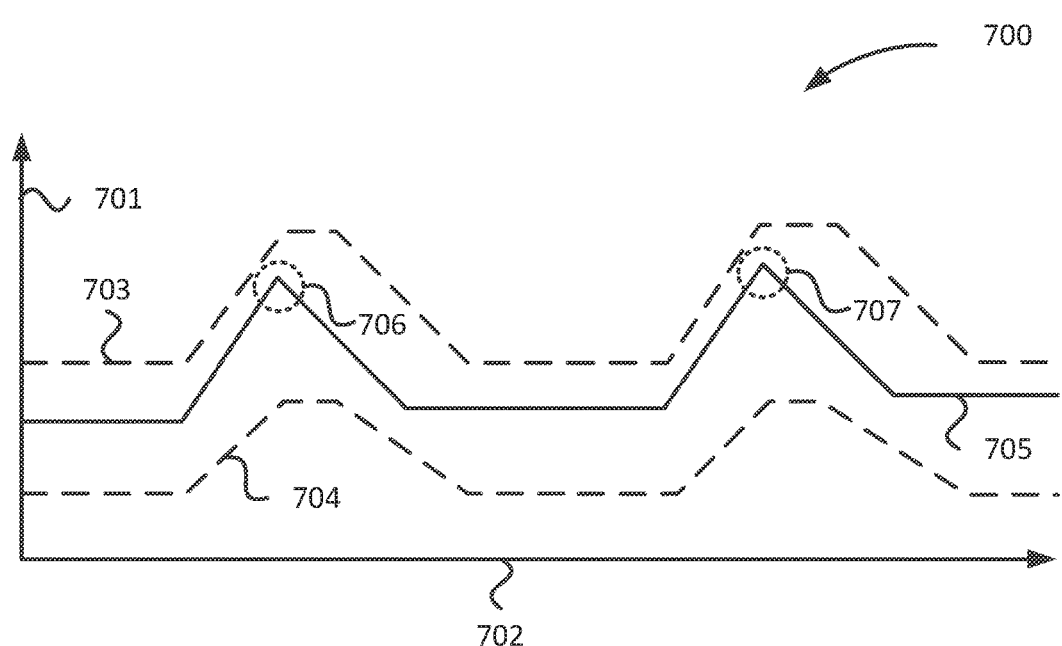
FIG. 7 is a timeline diagram demonstrating temporal variations in display luminance during a normal playback of a video data.

FIG. 7 is an example timeline diagram 700 showing temporal variations in display luminance during normal playback mode of video data on the display device 102. Vertical axis 701 is the luminance axis and horizontal axis 702 is the time axis. Dashed lines 703 and 704 indicate the upper and lower boundaries of the comfortable perception range determined by a human visual system (HVS) luminance adaptation model. A line 705 indicates the luminance over time of video data input to the display device 102. In one embodiment, the luminance illustrated by the line 705 is representative of a single sample location of the successive pictures of the video data. In another embodiment, the luminance illustrated by the line 705 is representative of a sub-set of video data samples. In another embodiment, the luminance illustrated by the line 705 is representative of all video data samples. In another embodiment, the luminance illustrated by the line 705 is calculated according to either CalculateMaxFALL or CalculateMaxCLL algorithm as specified by the Annex A of the CEA-861.3 'HDR Static Metadata Extensions for HDMI' standard. Local luminance peaks 706 and 707 of the luminance data 705 correspond to example content-dependent variations in video data luminance. As mentioned above, the human visual system (HVS) adaptation is not instant. Significant variations in luminance levels over a short period of time may result in a luminance levels exceeding comfortable perception range leading to visual discomfort of a viewer. Therefore, during the colour grading by the mastering module 202, the luminance data 705 is adjusted so that it does not exceed the comfortable perception range between the boundaries 703 and 704 during normal playback.

Figure 8A:
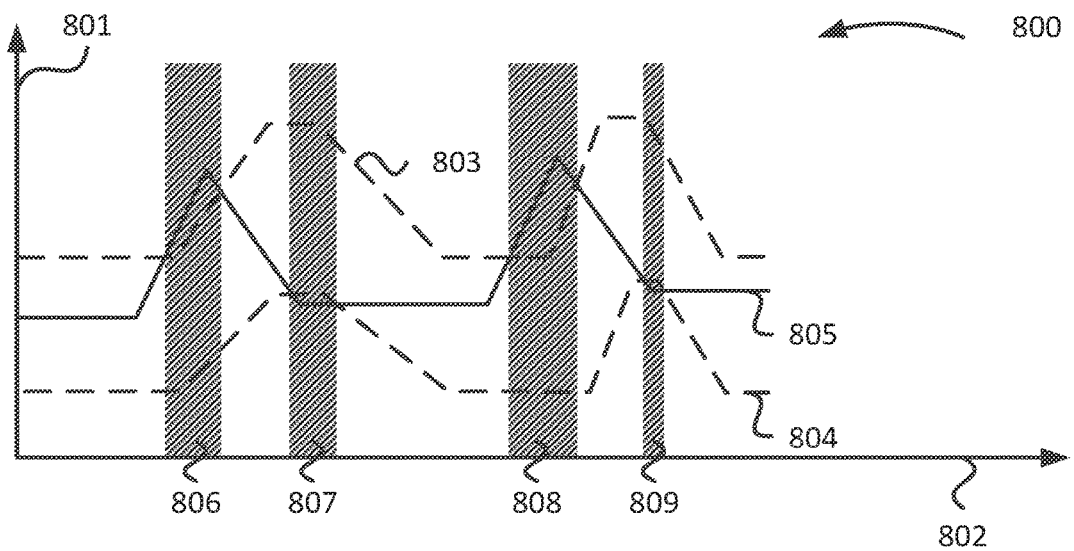
FIGS. 8A and 8B are example timeline diagrams showing temporal variations in display luminance and human visual system (HVS) adaptation during a fast-forward playback.

FIG. 8A shows an example timeline diagram 800 showing temporal variations in display luminance and human visual system (HVS) adaptation during fast-forward playback mode on the display device 102 of the same video data that is shown in FIG. 7. A vertical axis 801 is the luminance axis and a horizontal axis 802 is the time axis. The time axis 802 has the same scale as the axis 702 of FIG. 7. The dashed lines 803 and 804 indicate the upper and lower boundaries of the comfortable perception range determined by a human visual system (HVS) luminance adaptation model. A line 805 represents the same luminance data that is represented by the line 705. However, compared to the line 705, the line 805 is compressed in the time domain due to a faster playback speed. The diagram 800 is example of a case where no luminance modification is performed in response to an increased playback speed. In the example of FIG. 8A a viewer may experience visual discomfort during fast-forward playback caused by frequent variations in display luminance and inability of the human visual system (HVS) to adapt fast enough to the variations. Hatched zones 806 and 808 mark time ranges where the luminance data 805 exceeds the upper boundary 803 of the comfortable perception range and may be perceived by a viewer as too bright. Hatched zones 807 and 809 mark time ranges where the luminance data 805 exceeds the lower boundary 804 of the comfortable perception range and may be perceived as too dark. Frequent temporal changes in scene brightness are called 'flickering'. Where the display device 102 is a standard dynamic range (SDR) display with a relatively narrow dynamic range, the flickering may cause only a minor discomfort. However, where the display device 102 is a high dynamic range (HDR) display with a dynamic range matching or exceeding HVS dynamic range the flickering may significantly degrade viewing experience. Studies suggest that flickering may lead to temporary eye disorders and in severe cases trigger certain medical conditions such as epileptic seizures.

Figure 8B:
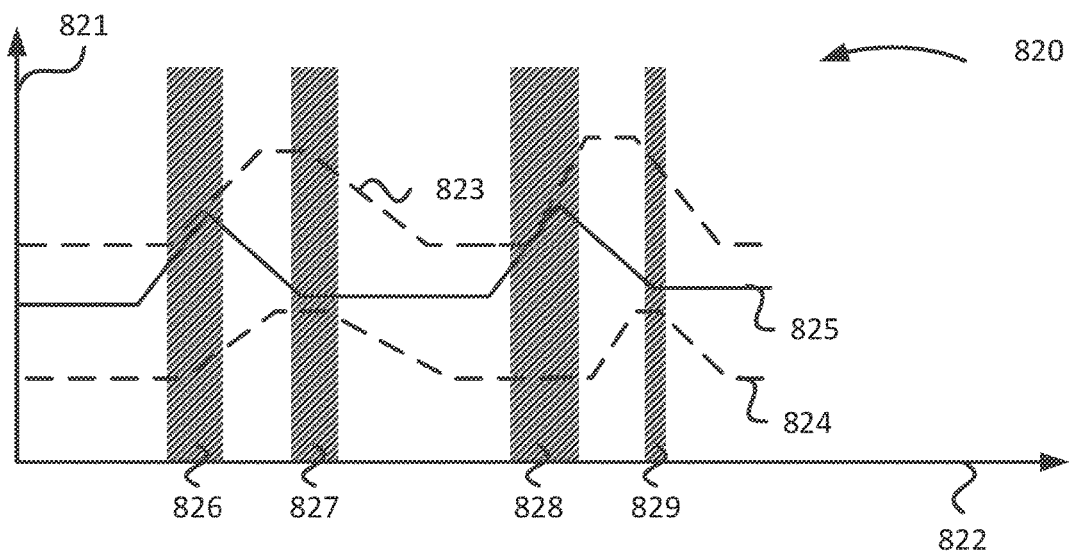

FIG. 8B shows an example timeline diagram 820 showing temporal variations in display luminance and human visual system (HVS) adaptation during fast-forward playback mode on the display device of the same example video data that is shown on diagrams 700 and 800. Vertical axis 821 is the luminance axis and horizontal axis 822 is the time axis. The time axis 822 has the same scale as the axis 802 of the diagram 800. Dashed lines 823 and 824 indicate the upper and lower boundaries of the comfortable perception range determined by a human visual system (HVS) luminance adaptation model. A line 825 represents a luminance data produced from the same video data that is used to produce the line 705. However, compared to the line 705, the data 825 is compressed in the time domain due to a faster playback speed. Hatched zones 826-829 mark the same time ranges as zones 806-809 of the diagram 800. The example of the diagram 820 shows a case where luminance modification is performed in response to an increased playback speed. The modification is performed by the adaptation module 307 as described below to fit the luminance data into a comfortable perception range delineated by the boundaries 823 and 824 for the entire duration of the fast-forward playback, including the time ranges 826-829.

Figure 9:
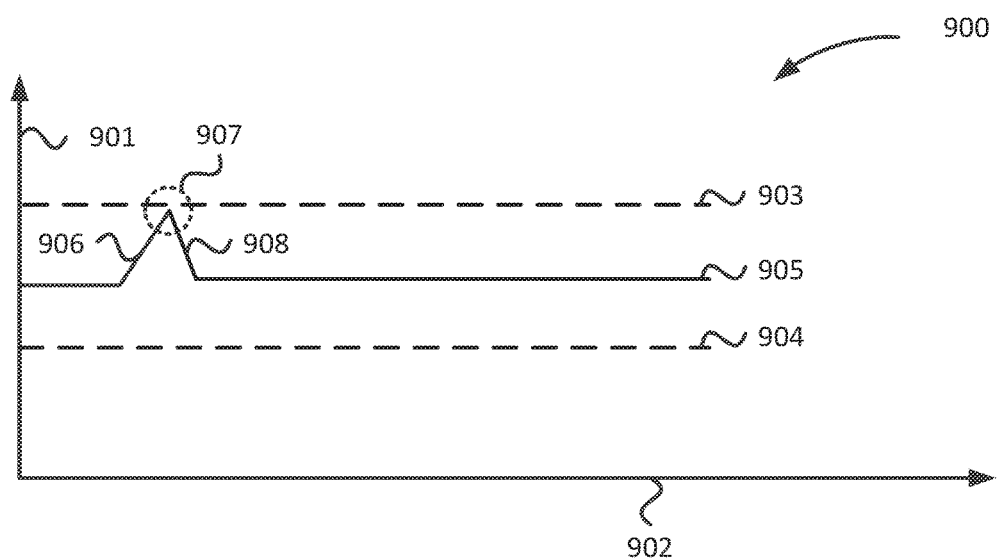
FIG. 9 is a timeline diagram demonstrating temporal variations in display luminance during a normal playback of video data.

FIG. 9 is an example timeline diagram 900 showing temporal variations in display luminance on the display device 102 during normal playback mode of video data. A vertical axis 901 is the luminance axis and a horizontal axis 902 is the time axis. The dashed lines 903 and 904 indicate upper and lower boundaries of the comfortable perception range determined by a human visual system (HVS) luminance adaptation model. A line 905 indicates the luminance over time of video data input to the display device 102. An ascending line segment 906, a local luminance peak 907 and a descending line segment 908 of the line 905 correspond to example content-dependent variations in video data luminance. In the example of the diagram 900, the luminance variations around the local luminance peak 907 may be modified by the mastering module 302 to stay within the comfortable perception range during normal playback, while maintaining the artistic intent of presenting a bright scene of short duration to a viewer. Due to the short duration of the scene, the human visual system (HVS) adaptation range indicated by the upper and lower boundaries 903 and 904 is not changed significantly during the normal playback.

Figure 10A:
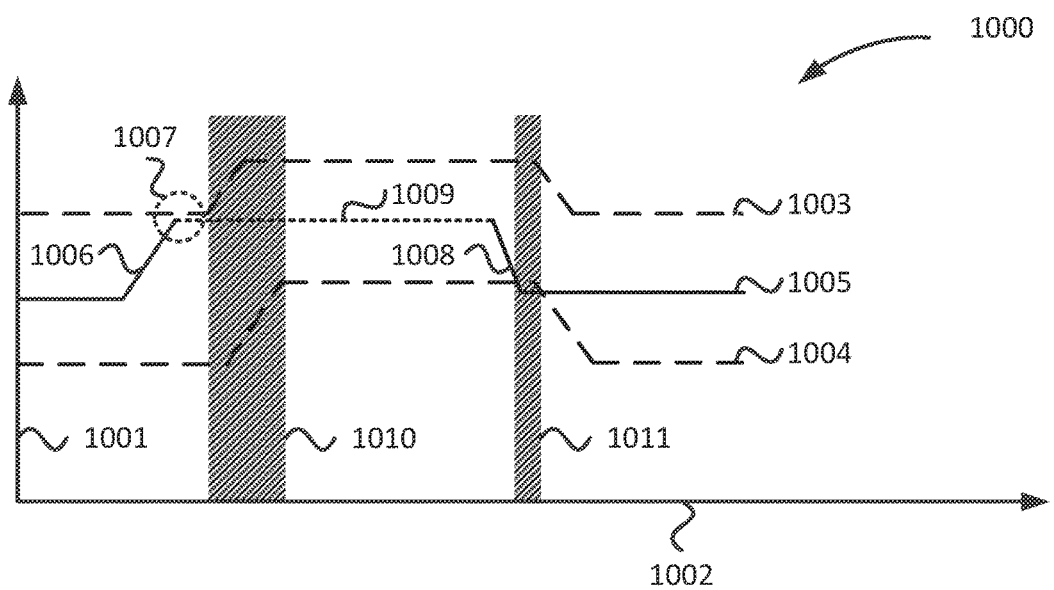
FIGS. 10A and 10B are exemplary timeline diagrams showing temporal variations in display luminance and human visual system (HVS) adaptation during a normal playback and pause.

FIG. 10A is an example timeline diagram 1000 showing temporal variations in display luminance on the display device 102 during a combination of normal playback mode and pause playback mode of the same example video data shown on the diagram 1000. Vertical axis 1001 is the luminance axis and a horizontal axis 1002 is the time axis. The time axis 1002 has the same scale as the time axis 902 of the diagram 900. Dashed lines 1003 and 1004 indicate the upper and lower boundaries of the comfortable perception range determined by a human visual system (HVS) luminance adaptation model. A line 1005 indicates the luminance over time of video data input to the display device 102. The line 1005 corresponds to the luminance data represented by the line 905, including an ascending line segment 1006 equal to the line segment 906, a local luminance peak 1007 equal to the luminance peak 907 and a descending line segment 1008 equal to the segment 908. In pause playback mode, the most recently displayed image continues to be displayed with the same luminance, as indicated by a horizontal dashed segment 1009 of the line 1005. Prolonged display of a relatively bright picture may lead to shifting of the viewer's comfortable perception range over a time range indicated by a hatched zone 1010. As a result, the human visual system (HVS) of the viewer becomes adapted to brighter display luminance levels at the expense of losing sensitivity to darker levels. After the viewer returns to the normal playback mode, a drop in luminance corresponding to the descending segment 1008 happens. A hatched zone 1011 indicates a time range where the luminance of the video data remains below the comfortable perception range indicated by the upper and lower boundaries 1003 and 1004. The example of the diagram 1000 illustrates a case where video viewing experience may be degraded if the playback is paused or performed at a speed slower than the normal playback speed and no luminance modification is performed.

Figure 10B:
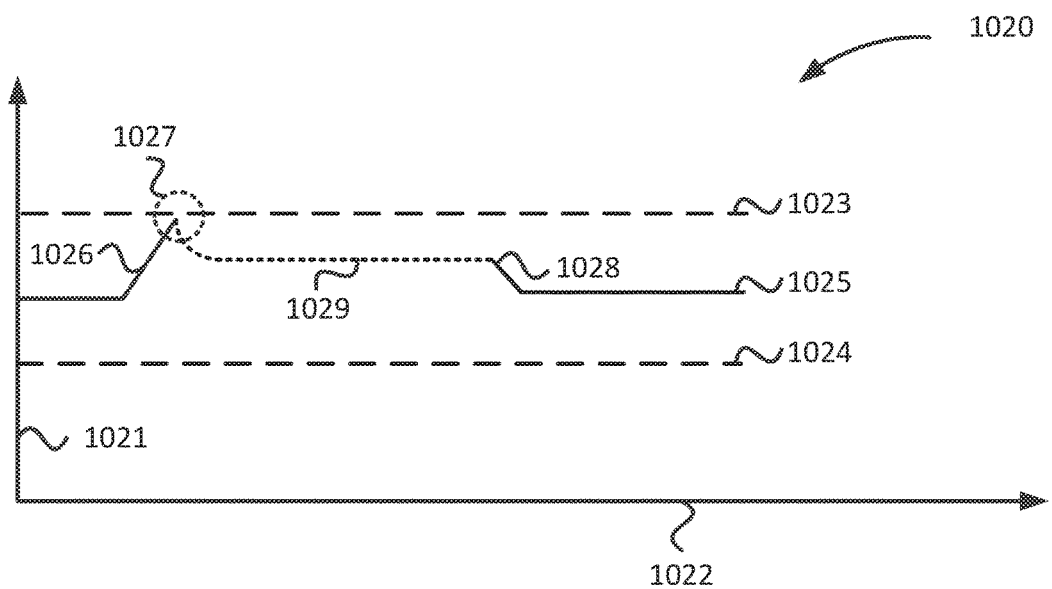

FIG. 10B is an example timeline diagram 1020 showing temporal variations in display luminance on the display device 102 during a combination of normal playback mode and pause playback mode of the same example video data shown on the diagrams 900 and 1000. In FIG. 10B, vertical axis 1021 is the luminance axis and horizontal axis 1022 is the time axis. Dashed lines 1023 and 1024 indicate the upper and lower boundaries of the comfortable perception range determined by a human visual system (HVS) luminance adaptation model. A line 1025 indicates the luminance over time of video data input to the display device 102. The line 1025 corresponds to the luminance data represented by the line 1005 of the diagram 1000, including an ascending line segment 1026 equal to the line segment 1006 and a local luminance peak 1027 equal to the luminance peak 1007. A descending line segment 1028 covers the same time range as the descending line segment 1008. However, the segment 1028 represents modified luminance levels. A viewer activates the pause playback mode on the playback device 101 at a time point corresponding to the local luminance peak 1027. In the pause playback mode, the most recently displayed image continues to be displayed. In the example of the diagram 1020 the luminance of the image displayed in the pause playback mode is modified according to a change in playback speed as indicated by a dashed segment 1029. The modification is performed to avoid or at least reduce the duration of displaying an excessively bright image in the pause playback mode. The modification is performed by the adaptation module 307 as described below.

Figure 11:
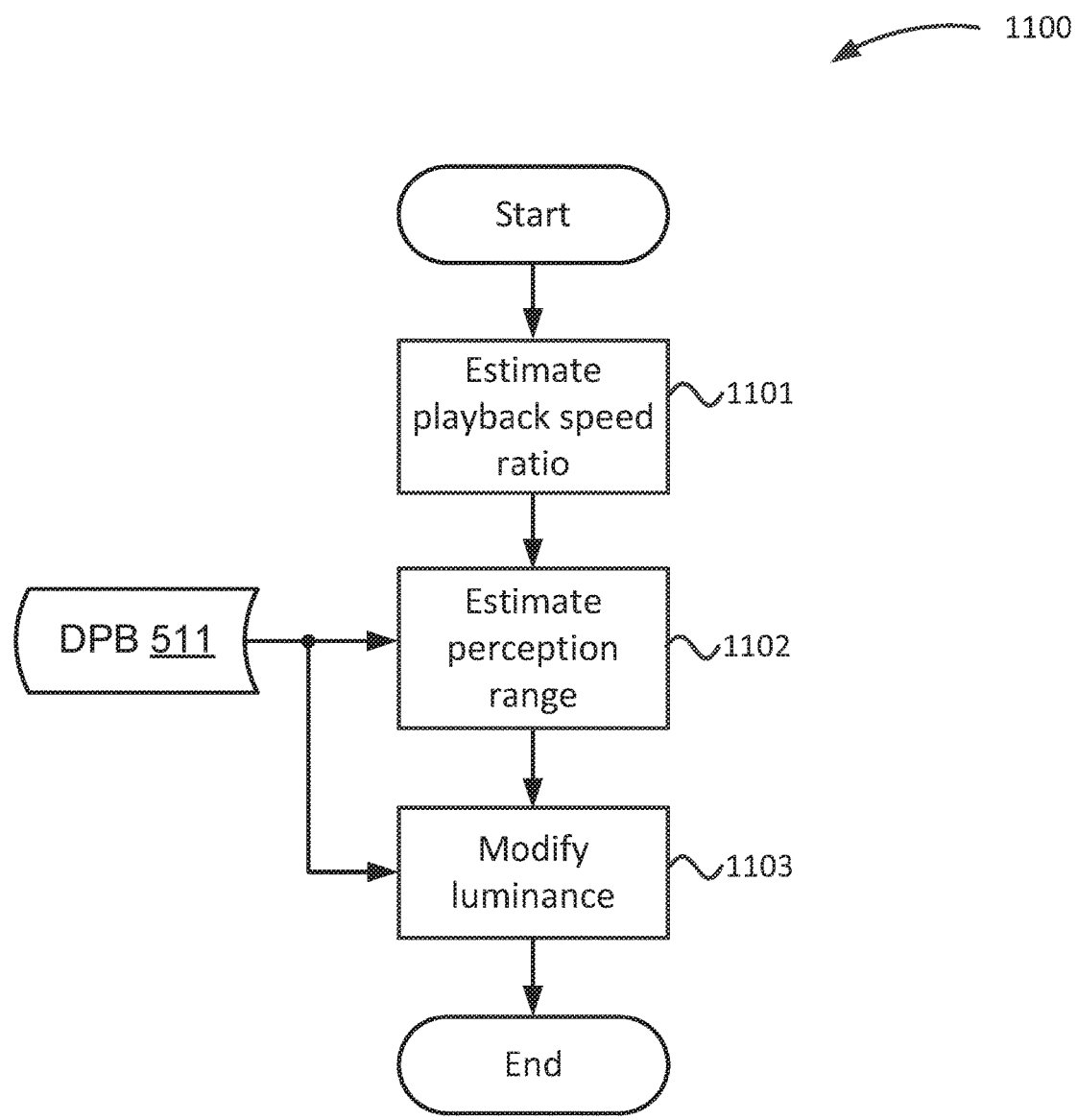
FIG. 11 is a schematic flow diagram showing a method of modifying an image.

FIG. 11 is a schematic flow diagram showing a method 1100 of modifying an image, as executed at the adapt step 602 of the method 600 within the adaptation module 307. The method 1100 is performed by the adaptation module 307 resident in the hard disk drive 210 and being controlled in their execution by the processor 205.

The method 1100 starts with a determining playback speed ratio step 1101. At the step 1101, the ratio of the current playback speed to the playback speed in normal playback mode is determined, under execution of the processor 205, as described below. At a determining perception range step 1102, the lower and upper boundaries of the comfortable perception range are determined under execution of the processor 205. In an embodiment of the step 1102, images stored in the decoded picture buffer 511 are used to determine the lower and upper boundaries of the comfortable perception range. Output of step 1102 is two numeric values, representing the lower and upper boundaries of the comfortable perception range. At a modifying luminance step 1103, an image from the decoded picture buffer 511 is read and the luminance of the image is modified by directly modifying video data samples of the image. Alternatively, at step 1103, the luminance of the image is modified by providing the playback device 101 or display device 102 with information about modified luminance as described below.

The step 1103 is performed to improve viewing experience, avoid or reduce display panel 'burn-in', and/or to reduce power consumption. After the step 1103, the method 1100 concludes.

In an embodiment of the determining playback speed ratio step 1101 of the method 1100, the playback speed ratio is determined as an average difference between the largest and the smallest picture order count (POC) values of last displayed images using Equation (1) as follows:

$$R = (\max(POC_0, \ldots, POC_{N-1}) - \min(POC_0, \ldots, POC_{N-1}))/N, \quad (1)$$

where N is a positive integer value known as 'window length'; $POC_0, \ldots, POC_{N-1}$ are picture order count (POC) values of the last N displayed images; max( ) is a function returning the largest among its arguments; min( ) is a function returning the smallest among its arguments; and R is a fractional value expressing the playback speed as a ratio of the playback speed in normal playback mode.

In the embodiment of Equation (1), the encoder module 303 increments the picture order count (POC) values monotonically by one (1) for every next image. In one embodiment, the processor 205 reads from the bitstream or infers as specified by an applicable specification the values of the vui_poc_proportional_to_timing_flag and vui_num_ticks_poc_diff_one_minus1 variables of a video usability information (VUI) message.

In another embodiment, the value of N is configured dynamically. After the start of a new video data sequence is detected by decoding an instantaneous decoding refresh (IDR) image or a broken link access (BLA) image from the bitstream or by other means, the value of N is set to one (1) and is incremented by one (1) after decoding every next image until a predetermined maximum value $N_{max}$ is reached, or the start of a new video data sequence is detected.

In another embodiment of the determining playback speed ratio step 1101 of the method 1100, the playback speed ratio is determined as a ratio of temporal distance between two consecutive images (or "frames") in the current playback mode and temporal distance between the same two images in the normal playback mode using the Equation (2), as follows:

$$R = 0, \text{ if } T_{P1} - T_{P0} = 0$$

$$R = \text{abs}((T'_{P1} - T'_{P0})/(T_{P1} - T_{P0})), \quad (2)$$

otherwise where P0 and P1 are two images displayed consecutively in the current playback mode; $T'_{P0}$ is a determined time point at which the image P0 is displayed on the display device 102 in normal playback mode; $T'_{P1}$ is a determined time point at which the image P1 is displayed on the display device 102 in normal playback mode; $T_{P0}$ is a determined time point at which the frame P0 is displayed on the display device 102 in the current playback mode; $T_{P1}$ is a determined time point at which the frame P1 is displayed on the display device 102 in the current playback mode; abs( ) is a function returning an absolute value of its argument. In one embodiment, an image timing supplemental enhancement information (SEI) message is used, under execution of the processor 205, to determine the values $T'_{P0}$, $T'_{P1}$, $T_{P0}$ and $T_{P1}$.

In another embodiment of the determining playback speed ratio step 1101 of the method 1100, the playback speed ratio is determined from the current playback mode. The normal playback mode corresponds to the ratio of one (1). The pause playback mode corresponds to the ratio of zero (0). The fast-forward, rewind and slow-motion playback modes correspond to the ratios of playback speed change provided by those modes.

In another embodiment of the determining playback speed ratio step 1101 of the method 1100, the video bitstream is a high efficiency video coding (HEVC) bitstream and the playback speed ratio is determined from the value of the duplicate_flag of an image timing supplemental enhancement information (SEI) message. The duplicate_flag indicates that the current image is a duplicate of the previous image in the display order. In one embodiment, upon receiving an image timing supplemental enhancement information (SEI) message with the duplicate_flag value equal to one (1) the playback speed is determined to be zero (0).

In another embodiment of the determining playback speed ratio step 1101 of the method 1100, the playback speed ratio is determined based on information from the receiving module 305. In one embodiment, the receiving module 305 detects transmission speed degradation, an interruption or a delay in transmission, a media reading error or other transmission condition that affects the playback. The current playback speed is determined, taking into account existing media transmission conditions. In one embodiment, the processor 205 may be used to detect that a network error occurred and that a bitstream is temporary unavailable, and in such a case the playback speed is determined to be zero (0).

In an embodiment of the step 1102, the lower and upper boundaries of the comfortable perception range are determined, under execution of the processor 205, according to a human visual system (HVS) luminance perception model, such as Barten's sensitivity model.

In another embodiment of the step 1102, the lower and upper boundaries of the comfortable perception range are determined, under execution of the processor 205, according to the Weber-Fechner law of human response to physical stimuli.

In another embodiment of the step 1102, the lower and upper boundaries of the comfortable perception range are determined based on ambient viewing conditions for the display device 102. The viewing conditions may be directly measured by a light sensor device.

Alternatively, the viewing conditions may be assumed to match one or more of the following recommendations and standards: Rec. ITU-R BT.2035 (July 2013) 'A reference viewing environment for evaluation of HDTV program material or completed programmes', Rec. ITU-R BT.500-13

(January 2012) 'Methodology for the subjective assessment of the quality of television pictures', Rec. ITU-R BT.2022 (August 2012) 'General viewing conditions for subjective, assessment of quality of SDTV and HDTV, television pictures on flat panel displays', Rec. ITU-R BT.710-4 (November 1998) 'Subjective assessment methods for image quality in high-definition television', Rec. ITU-R BT.1129 (February 1998) 'Subjective assessment of standard definition digital television (SDTV) systems', SMPTE ST.2086 'Mastering Display Color Volume Metadata Supporting High Luminance and Wide Color Gamut Images', SMPTE ST.2094 'Content-Dependent Metadata for Color Volume Transformation of High Luminance and Wide Color Gamut Images'.

In an alternative embodiment, the viewing conditions may be assumed to match those specified by supplemental enhancement information (SEI) messages decoded by the decoding module 306 from the bitstream, such as an ambient viewing environment supplemental enhancement information (SEI) message that specifies luminance and chromaticity coordinates of ambient light during the mastering process.

In an embodiment of the step 1103, luminance of the image may be modified in proportion to the playback speed ratio by applying the Equation (3) as follows, to video data samples of the image:

$$Q=\max(\min(R_{max},\max(R,1/R)),R_{min})$$

$$A(x,y)=(L(x,y)-LB)/(Q^{0.43})+LB \qquad (3)$$

where $A(x, y)$ is the luminance of an video data sample at location $(x, y)$ after modification; $L(x, y)$ is the luminance of the video data sample at location $(x, y)$ before modification; R is the playback speed ratio, as determined by the step 1101 above; LB is a lower boundary of a HVS comfortable perception range as determined at the 1102. $R_{max}$ and $R_{min}$ are minimum and maximum allowed values for R correspondingly. In one embodiment, $R_{max}$ may be equal to one (1) and $R_{min}$ equal to zero point five (0.5).

In one embodiment, the display module 308 uses an output code map look-up table (LUT) for mapping the video data samples decoded by the decoding module 306 to video data samples which are then used by the display module 308. Such mapping can be used for example to map perceptually uniform video data samples to linear luminance data samples, where the output code map look-up table (LUT) represents a luminance profile for displaying video data samples on the display 102 for the example video playback system 100 of FIG. 1. The mapping is performed using the Equation (4), as follows:

$$O=LUT[I] \qquad (4)$$

where LUT is the lookup table, I is an input code, O is an output code, and '[ ]' is an indexing operator that returns a lookup table element located at index I. In the embodiment of Equation (4), at the modify luminance step 1103, the look-up table (LUT) is modified instead of directly modifying video data samples to achieve the desired modification of the image luminance. Modifying the look-up table (LUT) modifies the luminance profile used for displaying the video data samples on the video display 102. In one embodiment, Equation (5), as follows, is applied to the look-up table (LUT):

$$Q=\max(\min(R_m,\max(R,1/R)),R_{min})$$

$$\text{OUTPUT\_LUT}[x]=(\text{INPUT\_LUT}[x]-LB)/(Q^{0.43})+LB \qquad (5)$$

where INPUT_LUT[x] is an input look-up table (LUT) value at index x; OUTPUT_LUT [x] is an output value at index x; R is the playback speed ratio, as determined by the step 1101 above; LB is a lower boundary of a human visual system (HVS) comfortable perception range as determined at step 1102; $R_{max}$ and $R_{min}$ are minimum and maximum allowed values for R correspondingly and '^' is the exponentiation operator. In one embodiment, $R_{max}$ is equal to one (1) and $R_{min}$ is equal to zero point five (0.5).

In one embodiment, the encoder module 303 transmits the output code map look-up table (LUT) in the bitstream using a supplemental enhancement information (SEI) or video usability information (VUI) message, where at the step 1103 the received look-up table (LUT) is modified to achieve the desired modification of the image luminance.

In one embodiment of the video playback system 100, a playback command is entered to a device other than the device that contains the adaptation module 307, and a standard protocol is used to inform the adaptation module 307 of the playback speed change. For example, the adaptation module 307 is implemented on the display device 102 and a playback command is entered using the remote control device 103 to the playback device 101. The devices 101 and 102 are connected using an High-Definition Multimedia Interface (HDMI) connection, and a 'HDMI Consumer Electronics Control' (HDMI CEC) protocol command is used to inform the adaptation module 307 within the device 102 of the playback speed change.

In another embodiment of the playback system 100, the playback device 101 uses a special message such as one specified by the HDMI HDR Static Metadata Extensions CEA-861.3 specification to inform the display device 102 of the electro-optical transfer function (EOTF) that is to be applied to the images of video data. In an embodiment where the playback device 101 uses a special message, at the modify luminance step 1103 the electro-optical transfer function (EOTF) is modified to be applied to the images of the video data to achieve the desired modification of the image luminance. In one embodiment, at the step 1103, the electro-optical transfer function (EOTF) value is changed from the 'Traditional gamma—HDR Luminance Range' (CEA-861.3 EOTF code 1) to the 'Traditional gamma—SDR Luminance Range' (CEA-861.3 EOTF code 0). In one embodiment, at step 1103 the electro-optical transfer function (EOTF) value from the 'SMPTE ST 2084' (CEA-861.3 EOTF code 2) to the 'Traditional gamma—SDR Luminance Range' (CEA-861.3 EOTF code 0). In another embodiment, at the step 1103, the 'Maximum Content Light Level' and 'Maximum Frame-average Light Level' values of the CEA-861.3 Static Metadata Descriptor Type 1 are changed in accordance with the desired modification of the image luminance.

In one embodiment, the adaptation module 307 modifies the image luminance to reduce electrical power consumption by the display module 308 if the playback speed is different from the normal. The reduction in power can produce significant power savings depending on the amount of power the display technology consumes to power the high dynamic range display. In one embodiment, at the modify luminance step 1103, the image luminance is reduced if the playback speed determined by the step 1101 is not equal to the normal playback speed. In one embodiment, the display module 308 implements the image luminance reduction in the most power-efficient way, applicable to the display hardware technology of the display module 308. For example, if the display module 308 uses a liquid crystal display (LCD)

backlit by one or more light source, then the luminance reduction is achieved by reducing the luminance of the back light source(s).

Some display technologies including cathode ray tube (CRT), liquid crystal display (LCD) or organic light-emitting diode (OLED) are prone to temporary or permanent display panel 'burn-in', where luminance and colour characteristics of individual pixels of the display panel degrade significantly, proportionally to cumulative pixel brightness over display usage time. In one embodiment, the adaptation module 307 modifies the picture luminance to reduce display panel 'burn' of the display module 308 if the playback speed is different from the normal. In one embodiment, at the modify luminance step 1103, the luminance of all video data samples is reduced if the playback speed ratio determined at the step 1101 is not equal to one (1). In another embodiment, at the modify luminance step 1103, the luminance of video data samples are reduced if the playback speed ratio determined at the step 1101 is not equal to one (1) and the sample luminance exceeds a predetermined maximum sample luminance threshold value. In these embodiment where the luminance of video data samples is reduced if the playback speed ratio determined at step 1101 is not equal to one (1), the 'burn-in' of display pixels is reduced because of and proportionally to the reduction of video data luminance. For example, with the cathode ray tube (CRT) technology, the phosphor coating of individual display pixels degrades in proportion to the luminance, therefore reducing luminance leads to reduction in speed of degradation.

In one embodiment of the video playback system 100, the 'Remote Control Pass Through' HDMI consumer electronics control (CEC) feature is used to inform the adaptation module 307 of playback mode change. The adaptation module 307 then determines the playback speed ratio from the playback mode.

In another embodiment of the video playback system 100, a command is added to the HDMI consumer electronics control (CEC) protocol to transmit information about playback speed ratio. In one embodiment, the information about playback speed ratio is transmitted as an auxiliary data packet using the HDMI 'Data Island Period'. For example, the picture order count (POC) value is transmitted for every picture using the HDMI 'Data Island Period' with an 'InfoFrame' packet or any other suitable encapsulation.

FIG. 12A is a schematic diagram showing a structure 1200 of a high-definition multimedia interface (HDMI) consumer electronics control (CEC) packet for transmitting information about the playback speed ratio. The message consists of three (3) packet header bytes: a first packet header byte 1201 ('HB0') is a packet type value 1204. This is a unique 8-bit value serving to distinguish this packet type from other high-definition multimedia interface (HDMI) consumer electronics control (CEC) packet types. Second and third packet headers bytes 1202 ('HB1') and 1203 ('HB2') together signal a playback speed ratio 1205. In one embodiment, the playback speed ratio 1205 is an IEEE-754 sixteen (16) bit 'half precision' floating point value. In an embodiment of the video processing software architecture 300, the structure 1200 may be used to transmit information about the playback speed ratio between the individual modules of the video processing software architecture 300.

FIG. 12B is a schematic diagram showing a structure 1220 of an high-definition multimedia interface (HDMI) consumer electronics control (CEC) packet for transmitting information about the playback speed ratio. The message consists of three (3) packet header bytes: a first packet header byte 1221 ('HB0') is a packet type value 1224. The packet type value 1224 is a unique 8-bit value serving to distinguish the packet type from other high-definition multimedia interface (HDMI) consumer electronics control (CEC) packet types. Second and third packet headers bytes 1222 ('HB1') and 1223 ('HB2') together signal a one-bit flag 1225 and an unsigned integer 1226. In one embodiment, the playback speed ratio is then determined using Equation (6), as follows:

$$R = X^{(1-2*Y)} \quad (6)$$

where R is the playback speed ratio, X is the unsigned integer 1226 from the structure 1220 representing, depending on the value of the flag 1225 either numerator or denominator of the playback speed ratio, and Y is the one-bit flag 1225 indicating whether X represents numerator or denominator of the playback speed ratio. In one embodiment, X is a signed integer in two's complement code. In an embodiment of the video processing software architecture 300, the structure 1220 may be used to transmit information about the playback speed ratio between the individual modules of the video processing software architecture 300.

Figure 13A:
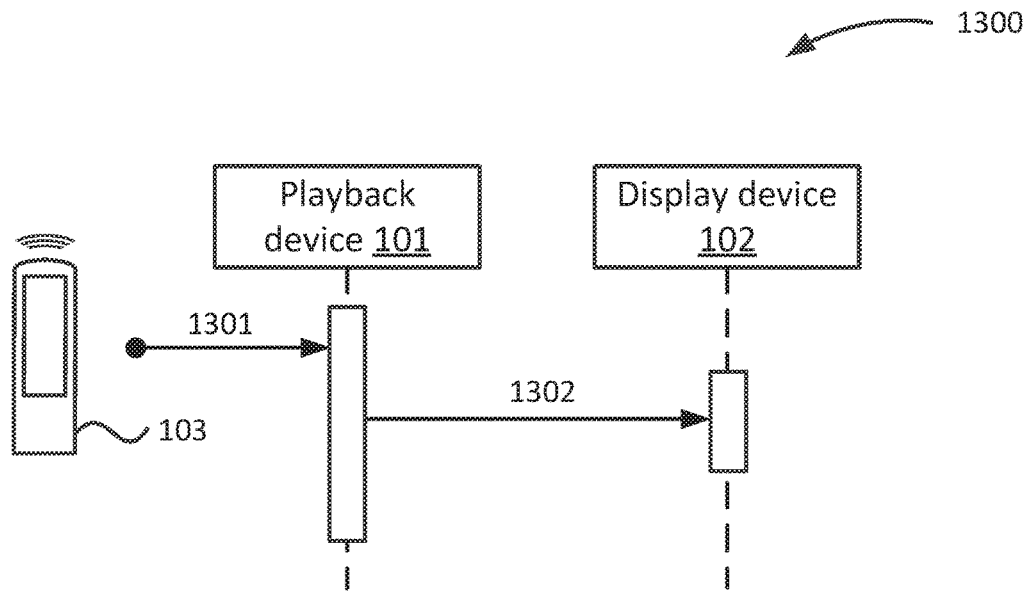
FIGS. 13A and 13B are schematic sequence diagrams showing protocol sequences for communicating the playback speed ratio information.

FIG. 13A is a schematic sequence diagram showing a protocol sequence 1300 for communicating the playback speed ratio information between the playback device 101 and the display device 102. As represented by arrow 1301, a playback command that initiates a change in the playback speed is input to the playback device 101 from the remote control device 103 or using any other input method. The playback device 101 changes the current playback mode in accordance to the received command and then, as represented by arrow 1302, the information about playback speed change is transmitted from the playback device 101 to the display device 102.

Figure 13B:
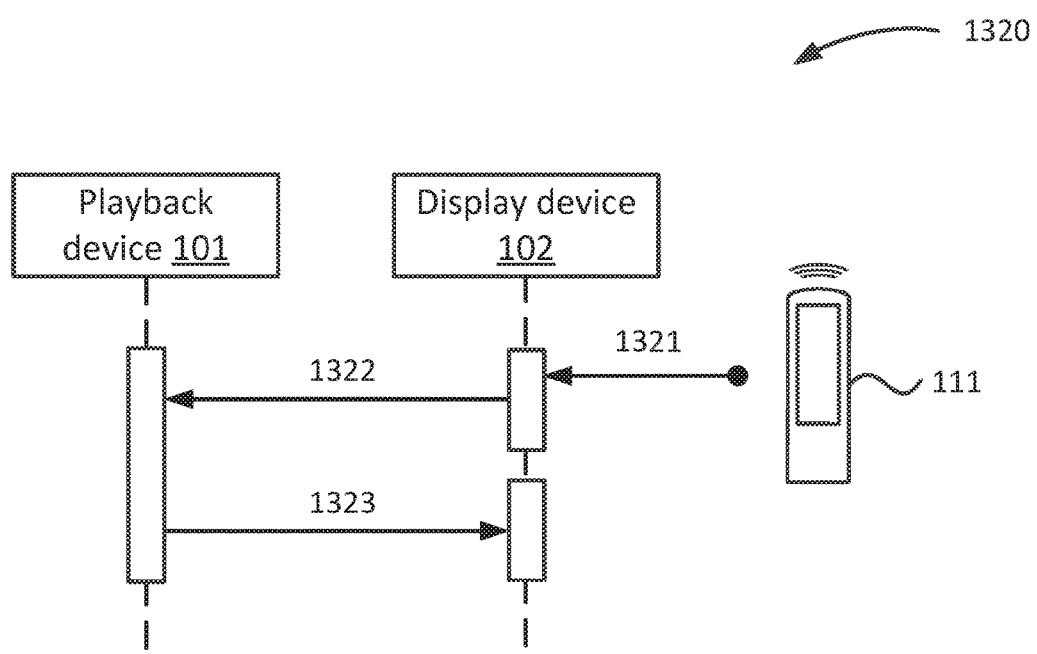

FIG. 13B is a schematic sequence diagram showing a protocol sequence 1320 for communicating the playback speed ratio information between the playback device 101 and the display device 102. As represented by arrow 1321, a playback command that initiates a change in the playback speed is input to the display device 102. The command is input using the remote control device 111 or using any other input method. Then, as represented by arrow 1322, the playback mode command is transmitted from the display device 102 to the playback device 101. The playback device 101 changes the current playback mode in accordance to the received command and as represented by arrow 1323 the information about the playback speed ratio change is transmitted from the playback device 101 to the display device 102.

In one embodiment, the mastering module 302 modifies video data according to a human visual system (HVS) adaptation model, taking into account a desired video playback speed different from the normal playback speed. The result of the modification performed by the mastering module 302 is a new video data sequence purported for playing back in one or more trick modes. In one embodiment, the video data adopted for trick-mode playback is encoded by the encoding module 303 and transmitted to the video playback system 100 together with the bitstream of the video data for the normal playback mode. The decoding module 306, upon receiving the bitstream containing video data for more than one playback mode, extracts and decodes only the portion of the bitstream corresponding to the current playback mode. In another embodiment, the display module 308 informs the encoding module 303 of the playback mode change. If the current playback mode is one of the trick modes for which the mastering module 302 provided modified video data, then the encoding module 303 transmits the bitstream comprising only video data modified for the trick-mode playback and omits the video data for normal playback from the bitstream.

In another embodiment, the mastering module 302 generates a modification transform according to a human visual system (HVS) adaptation model, taking into account a desired video playback speed different from the normal playback speed. The modification transform, when applied to the normal playback mode video data, modifies the video data for trick-mode playback. The encoding module 303 transmits within the bitstream a video usability information (VUI) or supplemental enhancement information (SEI) message comprising the trick mode modification transform, and information about which playback modes the function is applicable to.

In another embodiment, the modification transform is an electro-optical transfer function (EOTF) or a modification of an electro-optical transfer function (EOTF), the electro-optical transfer function (EOTF) being specified by ITU-R BT.709 Recommendation 'Parameter values for the high definition television (HDTV) standards for production and international programme exchange', or ITU-R BT.2020 Recommendation 'Parameter values for ultra-high definition television systems for production and international programme exchange', or SMPTE ST 2084 Standard 'High Dynamic Range Electro-Optical Transfer Function of Mastering Reference Displays', or another EOTF specification. In another embodiment, the modification transform is specified as a set of numeric parameter values to be applied to a predefined parameterized function. In still another embodiment, the modification transform is specified as a look-up table (LUT).

In an embodiment, the encoding module 303 detects using a side channel (not presented on FIG. 3) that the display module 308 performs playback with a playback speed different from the normal playback speed. Upon detection, the encoding module 303 transmits a supplemental enhancement information (SEI) or video usability information (VUI) message containing information about an electro-optical transfer function (EOTF) to be used with the current playback mode.

In an embodiment, the encoding module 303 detects that the receiving module 305 requests a bitstream purported for a trick-mode playback and concludes that the display module 308 performs playback with a playback speed different from the normal playback speed. In one arrangement, the encoding module 303 determines that receiving module 305 requests exclusively portions of the bitstream containing pictures encoded to facilitate trick mode playback and concludes that the display module 308 perform playback with a playback speed different from the normal playback speed.

Many of the embodiment described above may be combined. For example, in one embodiment, a playback device 101 receives a bitstream for normal playback using the MPEG Dynamic Adaptive Streaming over HTTP (DASH). A human operator may then change the play back mode to a fast-forward playback. The playback device 101 then requests the encoding module 303 to start transmitting a stream for the fast-forward playback mode. The encoding module 303 transmits a supplemental enhancement information (SEI) or video usability information (VUI) message comprising information about an electro-optical transfer function (EOTF) in a form of a look-up table (LUT) to be used with the fast-forward playback mode and starts to transmit a bitstream corresponding to the fast-forward playback mode. The decoding module 306 then receives the bitstream and maps the decoded images for display using the received electro-optical transfer function (EOTF). The display module 308 then performs playback of the mapped images.

INDUSTRIAL APPLICABILITY

The embodiments described are applicable to the computer and data processing industries and particularly for the digital signal processing for the encoding and decoding of signals such as video signals.

The foregoing describes only some embodiments of the present invention, and modifications and/or changes can be made thereto without departing from the scope and spirit of the invention, the embodiments being illustrative and not restrictive.

The invention claimed is:

1. A method of displaying images on a display, the method comprising:
    displaying images from a video playback on the display with a first luminance profile, the luminance profile mapping video data samples to output luminance of the display;
    detecting a user initiated modification of a speed of the video playback;
    determining a second luminance profile for the display of the video playback, the second luminance profile being determined according to the modified speed of the video playback and a human visual system adaptation model; and
    displaying further images from the video playback on the display using the determined second luminance profile.

2. The method according to claim 1, further comprising determining playback variation of a time based dynamic range of the video playback.

3. The method according to claim 1, wherein the human visual system adaptation model includes a predetermined adaptation speed of a viewer of the video playback.

4. The method according to claim 1, further comprising applying an electro-optical transfer function to the video data samples.

5. The method according to claim 1, wherein said second luminance profile is determined based on upper and lower boundaries of a comfortable perception range of the viewer.

6. The method according to claim 5, wherein the upper and lower boundaries are determined based on the human visual system.

7. The method according to claim 5, wherein the upper and lower boundaries are determined based on the Weber-Fechner law of human response to physical stimuli.

8. The method according to claim 5, wherein the upper and lower boundaries are determined based on the Barten's sensitivity model of human response to physical stimuli.

9. The method according to claim 5, wherein the upper and lower boundaries are determined based on ambient viewing conditions for the display device.

10. The method according to claim 5, wherein said second luminance profile is determined based on upper and lower boundaries based on ambient viewing conditions of the display.

11. The method according to claim 1, further comprising determining a ratio of a current playback speed to a further playback speed.

12. The method according to claim 11, wherein the playback speed ratio is determined based on average difference between the largest and the smallest picture order count values of displayed images.

13. The method according to claim 11, wherein the playback speed ratio is determined based on the current playback mode.

14. The method according to claim 11, wherein the playback speed ratio is determined based on information about transmission speed degradation.

15. The method according to claim 1, further comprising modifying video data samples of the further images using the second luminance profile.

16. A system for displaying images on a display, the system comprising:
a memory for storing data and a computer program;
a processor coupled to the memory for executing said computer program, said computer program comprising instructions for:
displaying images from a video playback on the display with a first luminance profile, the luminance profile mapping video data samples to output luminance of the display;
detecting a user initiated modification of a speed of the video playback;
determining a second luminance profile for the display of the video playback, the second luminance profile being determined according to the modified speed of the video playback and a human visual system adaptation model; and
displaying further images from the video playback on the display using the determined second luminance profile.

17. An apparatus of displaying images on a display, the apparatus comprising:
display module displaying images from a video playback on the display with a first luminance profile, the luminance profile mapping video data samples to output luminance of the display;
detection module for detecting a user initiated modification of a speed of the video playback; and
determining module for determining a second luminance profile for the display of the video playback, the second luminance profile being determined according to the modified speed of the video playback and a human visual system adaptation model, wherein further images from the video playback are displayed on the display using the determined second luminance profile.

18. A non-transitory computer readable medium storing a computer-executable program of instructions for causing a computer to perform operations comprising:
displaying images from a video playback on a display with a first luminance profile, the luminance profile mapping video data samples to output luminance of the display;
detecting a user initiated modification of a speed of the video playback;
determining a second luminance profile for the display of the video playback, the second luminance profile being determined according to the modified speed of the video playback and a human visual system adaptation model; and
displaying further images from the video playback on the display using the determined second luminance profile.

19. The method according to claim 1, wherein as part of the displaying further images step, the luminance of the further images are modified to avoid or reduce display panel 'burn-in'.

* * * * *